(12) United States Patent
Williams et al.

(10) Patent No.: US 11,025,733 B2
(45) Date of Patent: *Jun. 1, 2021

(54) DEVICE IDENTIFICATION TECHNIQUES USING SHARED DEVICE GRAPH

(71) Applicant: Xandr Inc., New York, NY (US)

(72) Inventors: Stephen Williams, Toronto (CA); Scott Menzer, Bedminster, NJ (US)

(73) Assignee: Xandr Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,145

(22) Filed: Jan. 30, 2020

(65) Prior Publication Data

US 2020/0228609 A1 Jul. 16, 2020

Related U.S. Application Data

(63) Continuation of application No. 15/611,052, filed on Jun. 1, 2017, now Pat. No. 10,581,980.

(51) Int. Cl.
*H04L 29/08* (2006.01)
*G06Q 30/02* (2012.01)

(52) U.S. Cl.
CPC ....... *H04L 67/146* (2013.01); *G06Q 30/0246* (2013.01); *G06Q 30/0275* (2013.01); *G06Q 30/0277* (2013.01); *H04L 67/22* (2013.01); *H04L 67/02* (2013.01)

(58) Field of Classification Search
CPC ....... H04L 67/146; H04L 67/22; H04L 67/02; G06Q 30/0246; G06Q 30/0275; G06Q 30/0277
See application file for complete search history.

(56) References Cited

U.S. PATENT DOCUMENTS

| | | | |
|---|---|---|---|
| 8,438,184 B1 | 5/2013 | Wang et al. | |
| 10,068,027 B2 | 9/2018 | Qiu | |
| 10,204,359 B1 | 2/2019 | Lee et al. | |
| 10,366,421 B1 | 7/2019 | Wu et al. | |
| 10,484,246 B1 * | 11/2019 | Leach ............ | H04W 84/18 |
| 2008/0256061 A1 | 10/2008 | Chang et al. | |
| 2012/0059713 A1 | 3/2012 | Galas et al. | |
| 2012/0271719 A1 | 10/2012 | Straley et al. | |
| 2013/0014136 A1 | 1/2013 | Bhatia et al. | |

(Continued)

*Primary Examiner* — Blake J Rubin
(74) *Attorney, Agent, or Firm* — Guntin & Gust, PLC; John G. Rauch

(57) ABSTRACT

Systems and methods for building a device graph for cooperative device identification are disclosed. Various information is received at a computing system over a communications network, include information defining a relationship between (i) a unique identifier associated with a first device of a user and (ii) a unique identifier associated with the user, and information defining a relationship between (i) a unique identifier associated with a second device of the user and (ii) the unique identifier associated with the user. The unique identifiers associated with the devices are each mapped to the platform-wide identifier based at least in part on the unique user identifier. A device graph comprising a plurality of device nodes is constructed, with related device nodes connected by one or more edges. Nodes representing the devices are linked based on a relationship identified between them using the platform-wide identifier.

20 Claims, 5 Drawing Sheets

(56) References Cited

U.S. PATENT DOCUMENTS

| | | |
|---|---|---|
| 2013/0060640 A1 | 3/2013 | Gadhia et al. |
| 2013/0124309 A1 | 5/2013 | Traasdahl et al. |
| 2014/0033074 A1 | 1/2014 | Thibaux et al. |
| 2014/0297394 A1 | 10/2014 | Li et al. |
| 2015/0020195 A1* | 1/2015 | Alizadeh-Shabdiz ............ H04L 63/1408 726/22 |
| 2015/0120713 A1 | 4/2015 | Kim et al. |
| 2015/0235275 A1 | 8/2015 | Shah et al. |
| 2015/0278883 A1 | 10/2015 | Stergiou et al. |
| 2015/0324857 A1 | 11/2015 | Siegel et al. |
| 2015/0348096 A1 | 12/2015 | Ferber et al. |
| 2015/0370814 A1 | 12/2015 | Liodden et al. |
| 2016/0048880 A1* | 2/2016 | Linden .............. H04L 67/42 705/14.66 |
| 2016/0055244 A1 | 2/2016 | Wang |
| 2016/0055542 A1 | 2/2016 | Hui et al. |
| 2016/0125471 A1 | 5/2016 | Hsu et al. |
| 2016/0182657 A1 | 6/2016 | Mukherjee et al. |
| 2016/0275545 A1* | 9/2016 | Dasdan .............. G06Q 30/0244 |
| 2016/0323239 A1 | 11/2016 | Cheng et al. |
| 2017/0039242 A1 | 2/2017 | Milton et al. |
| 2017/0083916 A1 | 3/2017 | Fadli |
| 2017/0161761 A1 | 6/2017 | Koh et al. |
| 2017/0272362 A1 | 9/2017 | Atlas et al. |
| 2017/0286558 A1 | 10/2017 | Kelleher |
| 2017/0337588 A1 | 11/2017 | Chittilappilly et al. |
| 2017/0359337 A1 | 12/2017 | Benguerah et al. |
| 2018/0152410 A1 | 5/2018 | Jackson |
| 2018/0227352 A1 | 8/2018 | Ortiz et al. |
| 2018/0227387 A1* | 8/2018 | Gersons .............. H04L 67/22 |

* cited by examiner

DEVICE IDENTIFICATION TECHNIQUES USING SHARED DEVICE GRAPH

CROSS REFERENCE TO RELATED APPLICATIONS

This application is a continuation of U.S. patent application Ser. No. 15/611,052, filed on Jun. 1, 2017, pending. All sections of the aforementioned applications and patents are incorporated herein by reference in their entirety.

BACKGROUND

The present disclosure relates generally to device identification and, more particularly, to systems and methods for identifying devices having common users by building a device graph using multiple sources of data.

Effectively identifying users across multiple devices is a necessity in a variety of industries. Individual users can use more than one device (e.g., a laptop, tablet, smartphone, et al.) to access the internet or other telecommunications networks through various web browsers and applications. Certain access providers have direct access to logins that can link users across devices. However, most do not have the scale and/or technical ability to identify any significant user groupings out of their data.

BRIEF SUMMARY

Systems and methods for cooperative device identification are described. In one aspect, a computer-implemented method for providing a shared device graph includes: receiving over a network information defining a relationship between (i) a unique identifier associated with a first device of a user and (ii) a unique identifier associated with the user; mapping the unique identifier associated with the first device to a platform-wide identifier based at least in part on the unique identifier associated with the user; receiving over a network information defining a relationship between (i) a unique identifier associated with a second device of the user and (ii) the unique identifier associated with the user; mapping the unique identifier associated with the second device to the platform-wide identifier based at least in part on the unique identifier associated with the user; and building a device graph comprising a plurality of device nodes, with related device nodes connected by one or more edges, wherein building the device graph comprises: identifying a relationship between the first device and the second device based at least in part of the platform-wide identifier; and based on the identified relationship, defining a link between a node representing the first device in the device graph and a node representing the second device in the device graph. Other implementations of the foregoing aspects include corresponding systems and computer programs.

Various implementations of these aspects can include one or more of the following. At a later time: the unique identifier associated with the first device is received over a network, and, based thereon, the platform-wide identifier is located; and using the device graph and the platform-wide identifier, the following are retrieved: (i) first information relating to the user that is stored in association with the node representing the first device and (ii) second information relating to the user that is stored in association with the node representing the second device.

Retrieving the first and second information include merging corresponding portions of data in the first and second information at the time of the retrieving. The unique identifier associated with the first device includes a cookie string or a mobile device identifier. The unique identifier associated with the user includes a username, a login identifier, or an email address. The unique identifier associated with the first device and the unique identifier associated with the second device are received from different data sources. A plurality of nodes in the device graph are respectively associated with different information regarding the user. A set of permissions are applied to the device graph to limit access to the user information to contributors to the device graph. The device graph includes a plurality of device subgraphs, each subgraph including nodes representing different devices associated with a same user, each node including at least one edge connecting the node to another node in the subgraph. The device graph includes a plurality of segregated device graphs represented as a single device graph. The device graph includes probabilistic relationships between nodes representing different devices.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

Reference will now be made to the accompanying drawings, which are not necessarily drawn to scale, and wherein.

DETAILED DESCRIPTION

Described herein are systems and methods for creating a unified identity graph from aggregating user information from multiple data sources. Each data source, such as a website operator, application provider, network provider, or other similar entity, generally has unique access to information about users that can be used to populate a shared device graph. Such user information can include a shared login across devices, an email address, or some other user identifier. A mutual benefit among data sources is created if they each contribute to the device graph in an identity cooperative, as the graph would grow substantially compared to what any single data source could produce alone. Members of the identity cooperative can include data sources that contribute information to build the device graph, as well as parties that have access to the graph but do not contribute data.

Figure 1:
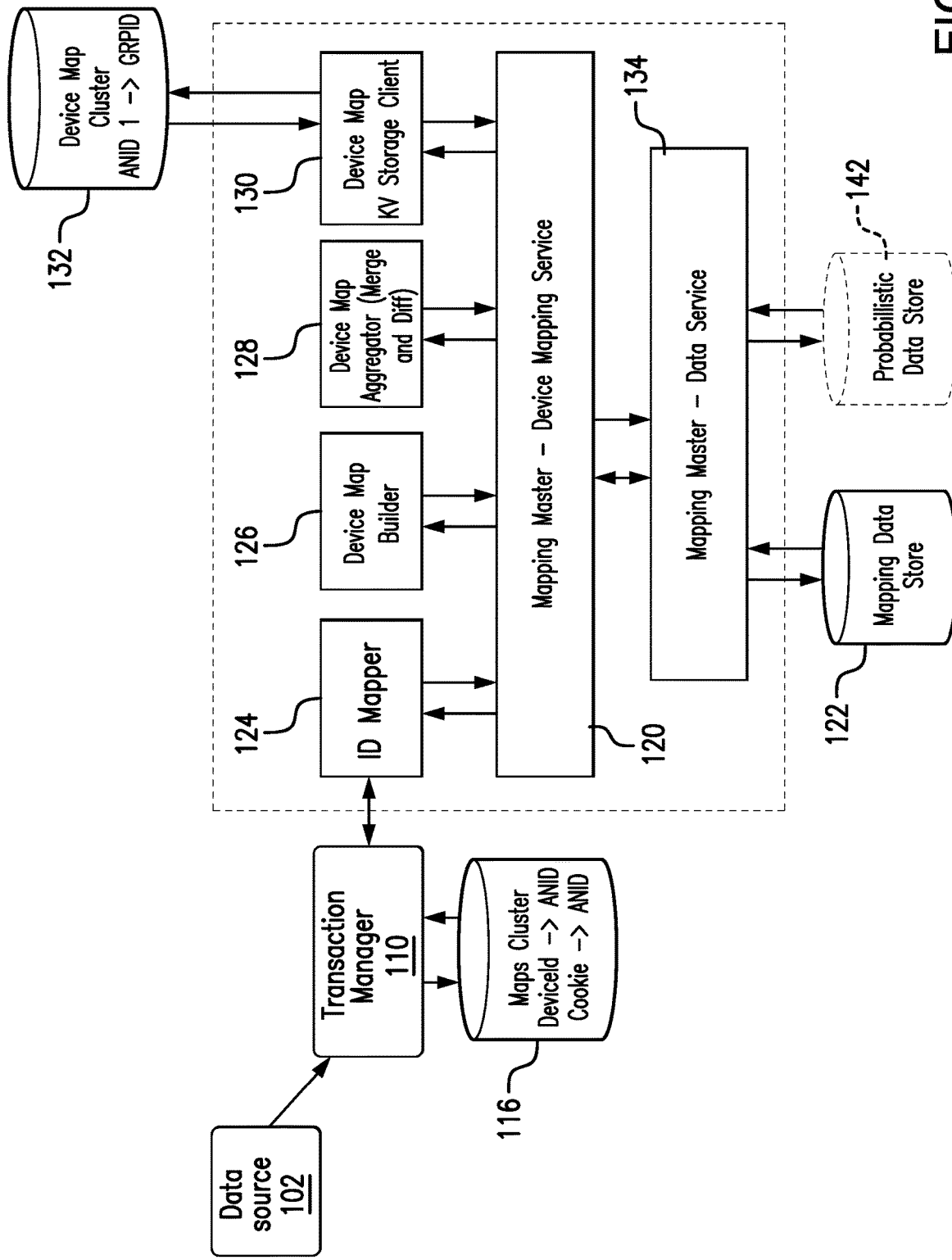
FIG. 1 depicts an example system for ingesting, storing, and processing deterministic data to build and make available a shared cross-device graph, according to an implementation.

FIG. 1 depicts one implementation of a system for ingesting, storing, and processing deterministic data in order to build and make available a shared cross-device graph. A data source 102 can provide real-time user information to transaction manager 110. In one example, data source 102 is a website provider that places on a webpage a tracking pixel having associated code (e.g., JavaScript code) to capture information associated with a user accessing or logging into the website, such as a string stored in a cookie file on the user's device. Although the term "cookie string" is used herein to refer to this type of information captured using a tracking pixel, it should be appreciated that other user information captured using browser-executable code, plugins, or other known techniques can be substituted as an identifier of a device accessing a website. Alternatively, a device identifier for the user's device can be captured using, for example, standard development kit (SDK) in a mobile application, if the user is accessing the site or otherwise logging in through or using a mobile application. The device identifier can be a unique value associated with the user's device, such as an Identifier for Advertising (IDFA), Android Advertising ID (AAID), International Mobile Equipment Identity (IMEi), and the like.

The cookie string or device identifier is then provided (alone or in bulk with other collected identifiers) in association with a unique identifier for the user (e.g., shared login across devices, an email address, or some other user identifier) to the transaction manager 110 using, for example, an application programming interface (API) made available by the transaction manager 110, or a bulk data transfer method, such as uploading using file transfer protocol (FTP). In some implementations, the unique identifier for the user is anonymized, transformed, encrypted, or obfuscated prior to or as part of the transfer of the identifiers to the transaction manager 110. In one example, the unique identifier is securely hashed with a salt using a strong, one-way encryption algorithm, such as SHA-2. Ultimately, each cookie string and device identifier is mapped to a platform-wide identifier (referred to herein as an "ANID") stored in maps cluster 116, where each ANID represents a user device identified by one or more data sources. In one example, the ANID is a 64-bit UUID2 value.

Still referring to FIG. 1, device mapping service 120 is responsible for scheduling daily jobs, orchestration of process activities and data retrieval/storage from/to mapping data store 122. ID mapper module 124 maps a mobile device identifier or cookie string in a deterministic data set to an ANID equivalent created or retrieved (if previously created) by the transaction manager 110. The ANID mapping can be cached in mapping data store 122 to avoid frequent device graph lookups by transaction manager 110. Cached mapping can be refreshed periodically (e.g., daily, weekly, etc.) to remove any expired or invalid ANID mappings. For example, an ANID to cookie string or device identifier mapping can expire if it has not been seen for at least 30 days, or some other time period. In some implementations, mapping data store 122 stores deterministic data associated with a device graph. In further implementations, a probabilistic data store 142 stores probabilistic device graph data (further described below).

Device map builder 126 builds the shared device graph (also referred to herein as a device map) of device pairs using devices as nodes (represented by the associated device identifier or cookie string) and relationships between devices as edges. In various implementations, relationships between devices (edges) can include devices identified as being associated with the same user, devices mapped to the same ANID, devices associated with the same hashed user unique identifier, devices identified by the same data source, and/or devices in the same group defined by a data source or other party. Device map builder 126 also removes deleted user device pairs and opted-out devices (e.g., devices associated with users expressing a desire not to be tracked) from the device map. Device map builder 126 can also detect inconsistencies in the device graph, such as identifying defined groups that have too many associated ANIDs (e.g., greater than 5 ANIDs), and remove such inconsistencies (e.g., delete the group of ANIDs). Further details on device graph building are provided below.

The device graph can be built using data from a particular period of time (e.g., last 30 days, last 60 days, etc.) and can include data aggregated from multiple data sources received as real-time and offline deterministic data sets. Each time a device graph is generated, device map aggregator 128 compares and merges the newly generated graph with one or more previously generated graphs and identifies additions and deletions from version to version. Device map key/value (KV) storage client 130 provides an interface to sync the device map structure to a key/value store in device map cluster 132, to allow for fast retrieval of data (e.g., retrieve ANID values associated with a group identifier key, retrieve group identifier values associated with an ANID key). Data service module 134 provides create, read, update, delete, and bulk copy operations for mapping tables, and causes the results of intermediate stages (ANID mapping, device map aggregation) to be persisted in data stores. In some instances, device map cluster 132 stores a device map data set including ANID (key) to its associated group identifier (value). Device map cluster 132 can further store a reverse mapping of group identifier (key) to one or more ANIDs associated with that group identifier (values).

Figure 2:
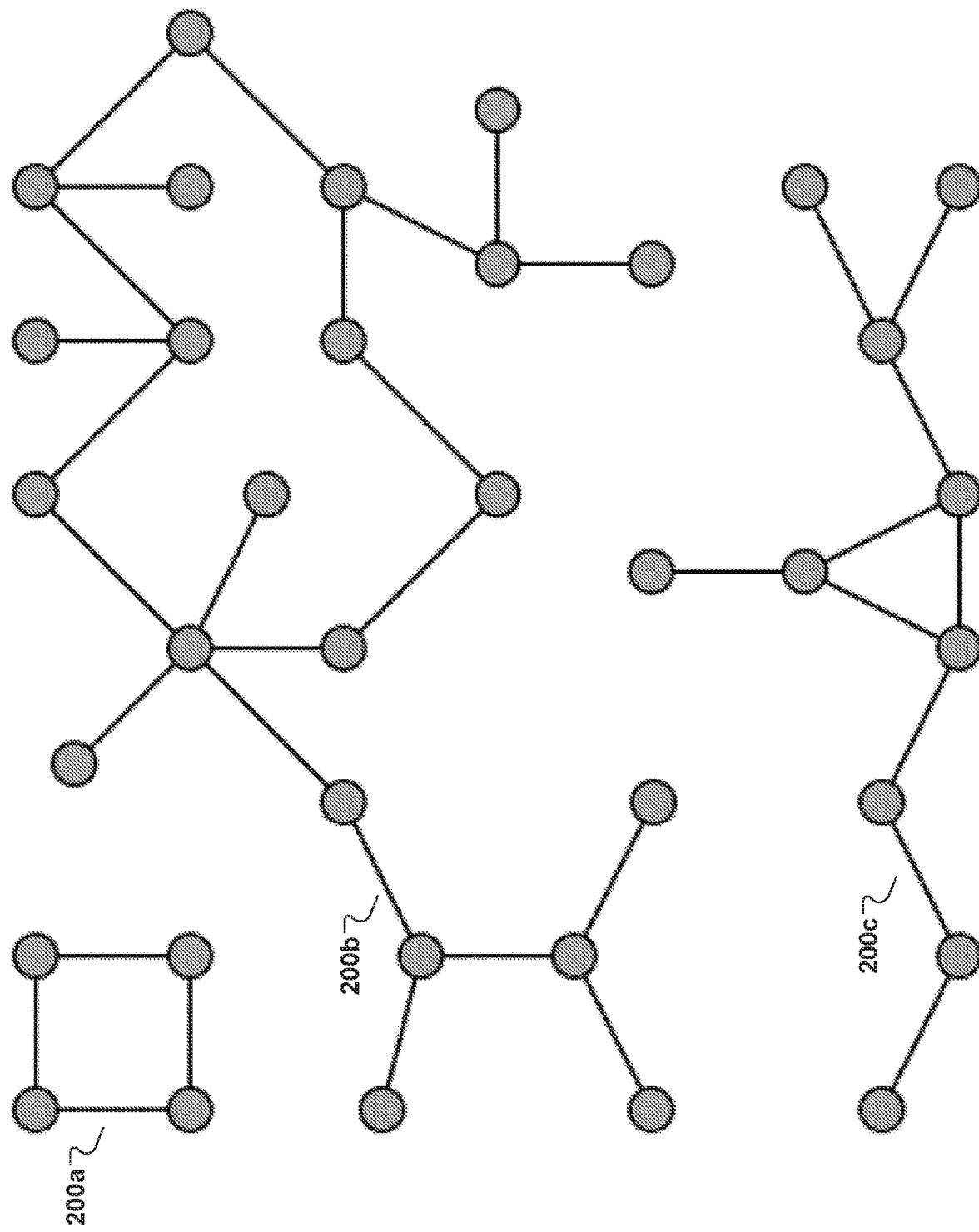
FIG. 2 depicts example device subgraphs in an undirected super graph constructed according to an implementation.

In one implementation, the device graph comprises a deterministic, undirected device super graph (where the edges are bidirectional), with potentially millions of connected components. Each connected component (also referred to as a "component") of the super graph represents the devices owned by a particular user, and takes the form of a subgraph in which any two vertices (devices) that can share a common ANID (or other common characteristic, such as identified above) are connected to each other by edges, or paths. Each graph component is not connected to vertices of any other components of the super graph. FIG. 2 depicts an example undirected super graph with three subgraphs 200a, 200b, and 200c. Each subgraph 200a, 200b, 200c represents the devices (identified by cookie string or device identifier) associated with (e.g., used by) a particular user. Techniques in commercially available graph and other database implementations can be used to traverse the undirected graph and identify connected components, including PostgreSQL recursive queries and functions available using the Apache Spark GraphX API and other graph databases (e.g., Neo4J, GraphLab, Giraph).

Figure 3:
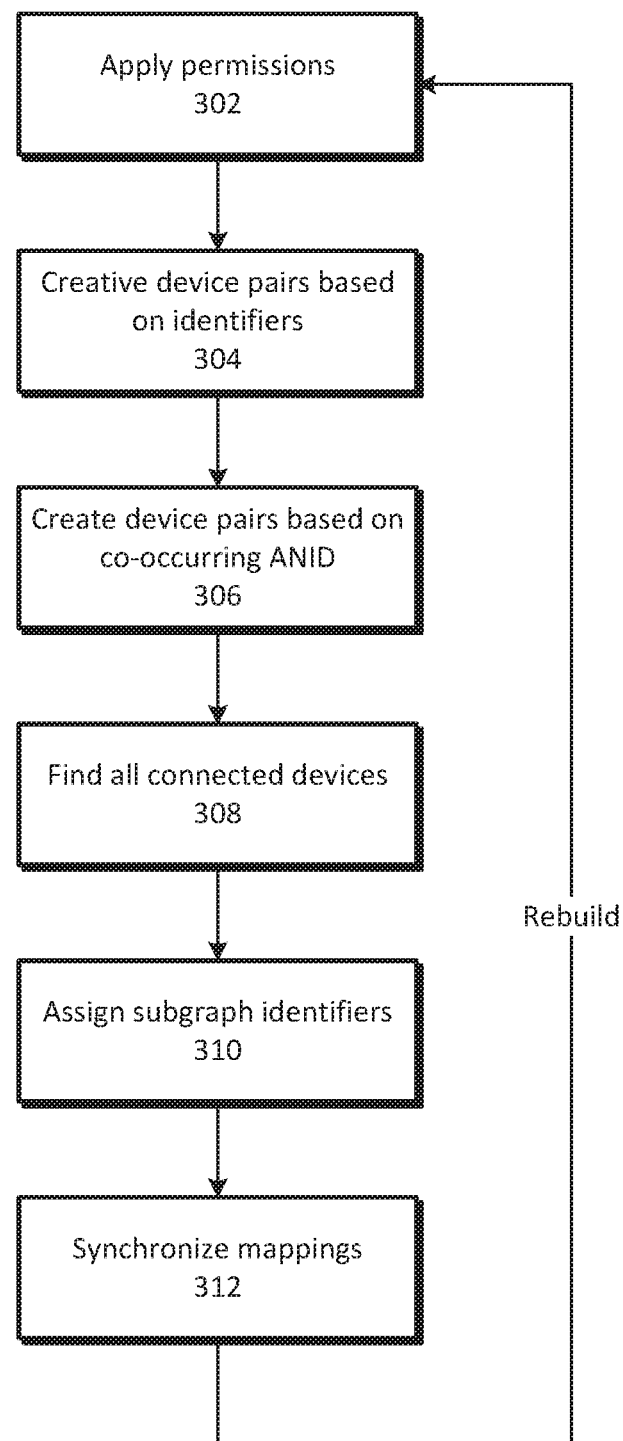
FIG. 3 depicts an example method for building a device graph according to an implementation.

Referring to FIG. 3, one implementation of device graph building proceeds as follows. In Step 302, a set of permissions (global/private) is applied to the available device data, assuming any permissions are applicable. In one implementation, the permissions indicate whether a certain portion of device data will be available to everyone, to users that participate in the shared device graph by contributing their own data, or only to a private audience (e.g., the original contributor of the data, any affiliates of the original contributor, etc.). In some implementations, the different permissions can be used to build different device graphs, where the device data in each respective device graph is permissioned similarly. In other implementations, all of the available data is used to build a single device super graph, but each party accessing information based on the graph receives only data they are permissioned to see.

In the first mapping pass (Step 304), the system creates device pairs based on any group identifiers provided by, e.g., members of the identity cooperative. Device pairs can also be created based on hashed login identifiers provided to the system. For example, if devices A, B, and C were all logged into using a user name that hashes to the same value, the system can create device pairs for A<->B, A<->C, and B<->C. In the second pass (Step 306), device pairs are created based on the ANID value of each device. Namely, a device pair is created when two devices share a common ANID, regardless of whether the devices were identified and contributed to the graph by different data sources. For the third pass (Step 308), connected devices are identified by traversing an undirected path (where edges are bidirectional) between device pairs. To model the relationship between devices (which can be associated with a user having multiple logins across multiple data sources), a graph-oriented approach is used. As previously noted, devices (identified using cookie strings and device identifiers) are represented as nodes in the graph, and edges between the nodes are established using deterministic data.

In Step 310, each subgraph (representing the cookie strings and device identifiers associated with a particular user) is assigned a group identifier. After this stage, each subgraph contains a set of ANIDs, and each ANID can be mapped to the group identifier for the group it belongs to. Mappings of (1) ANID to group identifier and (2) group identifier to list of ANIDs can then be stored by device map KV storage client 130 to device map cluster 132 for quick lookup (Step 312). The process can return to Step 302 periodically (e.g., daily, every 12 hours, etc.) to rebuild (add/delete data from) the device map using deterministic data from data sources from the last thirty days, or some other look-back time period.

In some implementations, one or more devices in a group of devices in the device graph (e.g., devices in a subgraph) have associated data. For example, a particular device can be associated with characteristics of a user of the device, such as demographic information (e.g., age, sex, income), web browsing history, viewing frequency for particular content or advertisements, viewing recency for particular content and/or advertisements, device type, device model, device operating system, browser type, geographical location, and any other type of advertising targeting information, such as marketing segments to which a user of the device belongs. This data can be associated with a device ANID and stored in a high performance database, such as those provided by Aerospike, for efficient retrieval. Segments can also have unique identifiers that are associated with one or more ANIDs. In an advertising context, segment identifiers allow marketers to assign values and information to users for targeting. Each segment can have a defined qualification such as a page view or purchase, and an optional value. For example, a T-shirt retailer could have a retargeting segment as well as a value assignment on purchases made by the user. Value is not necessarily restricted to purchase value and can represent any particular valuation, such as page views.

To take advantage of information collected from different contributors to the device graph, stored data associated with different devices can be merged (which can include aggregation, merging, and/or other forms of combining data) when retrieved from the high performance database (e.g., at the time of an impression auction). Whether data is merged can depend on, for example, whether the party requesting the data to be retrieved is a contributor to the device graph, whether that party has permission to access other portions of the device graph, or whether that party has provided some consideration in exchange for accessing the device graph. Depending on these or other circumstances, the requesting party may have access only to (i) data that it has contributed to the device graph, (ii) the foregoing data plus one or more other portions of the device graph, or (iii) all of the data in the device graph.

Consider, for example, a particular device subgraph that includes various devices identified as belonging to the same user, User A, with different devices in the subgraph having been contributed to the device graph by different parties. Each device can be associated with various characteristics of User A, as described above, including some same or different characteristics from other devices in the subgraph. In order for each party with access to the device graph to take full advantage of all of the known characteristics of User A (subject to any permissions limiting any party's access to such data), the characteristics associated with all devices in the subgraph can be merged and made available as combined characteristics of User A. As one example of the foregoing, one device in the subgraph, Device 1, can have associated data indicating that User A has been exposed to Advertisement X on Device 1 twice in the past 48 hours, and another device in the subgraph, Device 2, can have associated data indicating that User A has been exposed to Advertisement X on Device 2 once in the past 48 hours. When merged, this information indicates that User A has been exposed to Advertisement X at least three times in the past 48 hours on two different devices. This information is useful not only to those parties who contributed the information regarding Devices 1 and 2 to the subgraph, but also to other parties who may have contributed information regarding other devices in the subgraph and who previously had no knowledge that User A had previously been exposed to Advertisement X.

Various data merging techniques can be utilized depending on the data to be merged. As described above, advertisement frequency counts can be aggregated. Data provided in ranges, such as age range or income range, can be merged to form a single range including both ranges or only overlapping values. For example, if Device A is associated with demographic information specifying the user's age is in the range of 20-35, and Device B has associated information specifying an age in the range of 30-40, the merged range can be either 20-40 or 30-35. In some instances, data associated with different devices in a subgraph may conflict. For example, Device A's associated information may indicate that the user is male, while Device B's information indicates that the user is female. To address such conflicts in a merger, the value associated with a device designated as the primary device can be the value that survives the merger. The primary device can be, for example, the device for which a bid request is received in an impression auction. In other implementations, the oldest, most recent, or most common value can be selected as the surviving value. Other methods for addressing conflicts are contemplated.

As earlier described, access to the device graph and the data provided by a particular therein can be restricted wholly or in part, depending on access permissions associated with the party. In one implementation, a single device graph exists, and only parties that contribute to the device graph (e.g., provide user data, provide monetary compensation, etc.) are permitted access. In the context of an online advertising platform maintaining the device graph, impression sellers and impression buyers that are members of the identity cooperative can received merged data from the device graph. For example, with respect to a particular impression auction, if both the impression seller and buyer (s) are participating in the identity cooperative, both parties can receive merged data from the device graph, because there is a reduced or no concern regarding data leakage.

Merged data can also be provided to both parties if only one of the buyer or seller participates in the cooperative. In the event only the seller participates, the seller may want impression buyers to have access to cross-device information on the seller's users to increase competition for the seller's inventory and increase yield. For example, if the impression consumer is on a mobile device, and a relationship is identified between the mobile device and a desktop computer used by the impression consumer, then a buyer who is not participating in the cooperative but desires to target the desktop user will be able to serve impressions to the mobile device user. If only the buyer is participating, the buyer may nonetheless prefer to target its users on any inventory, including sellers who also buy impressions on the same ad serving platform. In other instances, when a non-participating seller has an impression available, only buyers who are participating can use the device graph portion associated with the user. If neither the impression seller nor buyer is part of the identity cooperate, neither is permitted to benefit from the full device graph, and receives only unmerged data (e.g., only the data the particular party has contributed to the device graph).

In some implementations, the system can utilize more than one device graph, separately or in combination. For example, a single device graph can be maintained for information lookup purposes, but the information can be sourced from multiple, separate device graphs. This technique can be useful if, for example, parties participating in the identity cooperative want to segregate the data they contribute and are uncomfortable with aggregating or sharing data in any manner with a competitor or potential competitor. Further still, it may be desirable or necessary to group certain parties (e.g., impression sellers) by geographical region or other characteristic due to privacy and/or policy concerns. Moreover, separate device graphs can be used in this event that a particular party, such as a large, strategic client, requires exclusivity.

In one implementation, the present system can utilize a deterministic device graph, a probabilistic device graph, or a combination of both. For example, probabilistic data can be used when deterministic data is unavailable (whether because such data does not exist in the device graph, or because the requesting party does not have permission to access such data). The use of probabilistic data in a device graph is advantageous in the case of, e.g., an impression buyer that desires to increase the range of its marketing campaign. In some implementations, the system identifies the probability that different identifiers are associated with the same user, and creates an association between the identifiers if the probability exceeds a threshold (e.g., 50%, 75%, 90%, etc.). For example, consider a single user having a smartphone and a laptop, each having its own unique identifier. During the evening and weekends, the two unique identifiers are often identified in communications sourcing from the same IP address (e.g., at the user's home), whereas, during the workday, the identifiers are often identified in communications sourcing from a different IP address (e.g., at the user's workplace). Using standard techniques in statistical analysis, machine learning, and the like, a likelihood can be determined that the two unique identifiers and their respective devices are associated with the same user. A device graph built from probabilistic data can be maintained separately from the deterministic device graph; however, in some instances, it can be advantageous to combine the different types of graphs into a comprehensive device graph.

Figure 4:
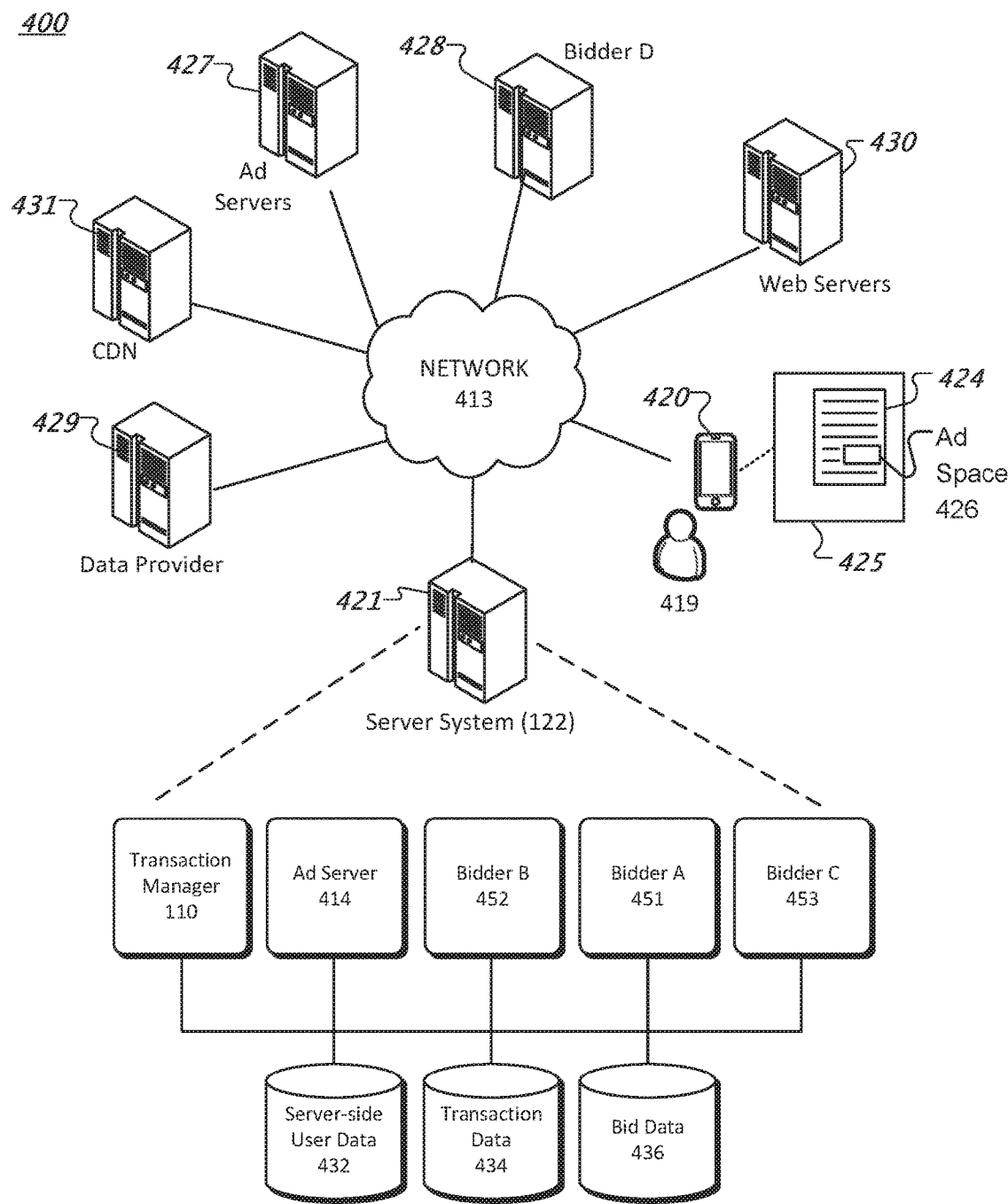
FIG. 4 depicts an example platform for implementing the device graph construction system and techniques described herein.

FIG. 4 depicts an example system and platform 400 for providing online advertising auctions to serve creatives to impression consumers that can incorporate the device graph systems and techniques described above. As referred to herein, a creative can include an advertisement or other content in the form of an image, video, animation, or other media that can be served to an impression consumer through a web browser, mobile native application, or other means of providing advertising content to a user. In some implementations, a creative includes a data structure, container, or other object in an online advertising platform that includes the advertising content or a reference thereto, as well as other information associated with the creative including, but not limited to, an advertiser or publisher associated with the ad content, a unique identifier for the creative, advertising brand, associate ad campaigns, ad content format, ad content dimensions, tracking pixels, and audit status. Advertising creatives can be provided by ad servers or other content delivery servers in digital ad space that is, for example, pre-purchased as part of a block of impression inventory or purchased in a real-time bidding auction for the particular impression.

Server system 422 provides functionality for real-time impression inventory data packaging and auctions. The server system 422 comprises software components and databases that can be deployed at one or more data centers 421 in one or more geographic locations, for example. The server system 422 can utilize appropriate hardware or software and can execute, for example, on one or more server class computers that have sufficient memory, data storage, and processing power and that run a server class operating system (e.g., Oracle® Solaris®, GNU/Linux®, and the Microsoft® Windows® family of operating systems).

The server system 422 implements an online advertising platform having software components that comprise a transaction manager 110, ad server 414, and one or more bidders (e.g., bidder A 451, bidder B 452, and bidder C 453). The server system 422 can also include one or more software components for load balancing tools and security tools. The load balancing tools manage traffic within a single data center or among multiple data centers. The security tools manage data protection and access privilege for tenants served by the data centers 421. The software components can include subcomponents that can execute on the same or on different individual data processing apparatuses. The server system 422 databases comprise a server-side user data database 432, transaction data database 434, and bid data database 436. The databases can reside in one or more physical storage systems.

The transaction manager 110 (also referred to herein as an "impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are contemplated. A seller can be a publisher (e.g., newspaper or social network), an online streaming or gaming service, or an ad network. Other sellers are contemplated. The transaction manager 110 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 110 can store in the transaction data database 434 various transaction information for each impression that is handled by the transaction manager 110 or other software components of the server system 422.

The ad server 414 is a software component that serves creative content to web pages or other applications. The ad server 414 can also make decisions about what creatives to serve, and track clicks or other user interactions with creatives, for example. As noted above, a creative can include a visual or audio advertisement such as an image, an animation, a video clip, or an audio clip, although other types of creative content are contemplated.

A bidder system or bidder (e.g., bidder A 451) is a software component that, on behalf of a buyer, performs bidding operations. The bidder takes various pieces of bid-specific information (e.g., maximal bid price, target user areas or segments, start and end dates, budget) as input and generates a bid for a particular item of an impression inventory, for example. A buyer can set up (e.g., through an API or web pages provided by the server system 422) a campaign targeting certain types of impressions with a set of bid-specific information for the impressions and store the bid-specific information in bid data database 436. In some implementations, a bidder can be remote from the server system 422, such as bidder D 428. Here, impression inventory can be a collection of one or more ad spaces on web pages served by a publisher's web site. Impression inventory can also be a collection of one or more ad spaces in user interfaces presented by a software application published by a publisher. Other collections of ad spaces of impression inventory are contemplated.

The transaction manager 110 conducts an auction when receiving an ad request for filling an available ad space. By way of illustration, a graphical user interface 424 of a software application 425 executing on client device 420 of a user 419 can include an ad space 426 and a corresponding ad tag. The application 425 can be a web browser application, or a software application such as a game application or a maps application. The application 425 can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. Examples of commercially available web browser software include Microsoft® Internet Explorer®, Google® Chrome®, Mozilla® Firefox®, and Apple® Safari®. In one example, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are contemplated. Here, the client device 520 can be a mobile phone, a smartwatch, smart glasses, a tablet computer, a personal computer, a game console, a television, or an in-car media system. Other examples of a client device are contemplated.

In some implementations, an ad tag comprises a Uniform Resource Locator (URL) from which an ad will be requested (e.g., a URL for the server system 522), Hypertext Markup Language (HTML) statements and/or JavaScript instructions for retrieving and displaying a creative (e.g., displaying the creative in a 160×600 iframe). The application 425 running on the client device 420 can retrieve content in the user interface 424 (e.g., a web page) through one or more data communication networks 413 such as the Internet, for example, from web servers 430 of a publisher. The ad tag causes the application 425 to send (e.g., through the networks 413) an ad request ("ad call") to the server system 422. In some implementations, the application 425 sends an ad request to the server system 422 via another advertising server system such as an ad exchange. The ad request can include information about the available ad space 426 (e.g., a size for the ad space, an identifier for the publisher), user information (e.g., an identifier of the user 119, an Internet Protocol or IP address), and system information (e.g., types of the browser and the client device), for example. The ad request can be composed in JavaScript Object Notation (JSON) or Extensible Markup Language (XML) format and transmitted to the server system 422 using Hypertext Transfer Protocol (HTTP) protocol (e.g., using HTTP POST request method). Other ad request formats and transmission methods are contemplated.

Data associated with the ad space 426 can include data associated with the user 419 such as user segment data and user behavioral data. User segment data include demographic information such as age, gender, location, school, and work. Other user segment data are contemplated. User behavioral data can include data associated with a user's online activities, for example, that the user put a toy in a shopping cart, the user searched for a toy, the user visited an online toy store yesterday, and a frequency the user searched for a toy. Other user behavioral data is contemplated.

Data associated with the ad space 426 can also include contextual data of the user interface 424. For instance, contextual data can include type of the user interface 424 (e.g., a home page, a user interface of a game application), structure of the user interface 424 (e.g., a number of ads on the user interface 424), and content of the user interface 424 (e.g., game, finance, sports, travel, content not suitable for children). Other contextual data is contemplated.

User segment data such as demographic information can be provided by a user to a publisher when the user accesses websites or applications published by the publisher. User segment data such as location can also be determined by data associated with the user's client device (e.g., client device 420) such as an Internet Protocol (IP) address associated with the client device. User behavioral data can be collected by software executed by an application (e.g., application 425) on a user's client device (e.g., client device 420). Contextual data of a user interface (e.g., a web page presented by the client application 425) can be determined by analyzing content (e.g., words, semantics) presented in the user interface.

A buyer (or a seller) can acquire data associated with an ad space from the ad space's publisher or from a data provider (e.g., Proximic of Palo Alto, Calif.). In various implementations, the buyer (or the seller) can store user data in the server-side user data database 432. For instance, the buyer can store in the server-side user data database 432 mappings between user identifiers and user segments.

In response to the ad request, the transaction manager 110 generates a bid request including information about the impression, the user, and so on, and sends the bid request to multiple bidders such as bidder A 451 and bidder B 452. The transaction manager 110 can also send the bid request through the networks 413 to servers of bidder D 428, which is external to the server system 422. The bid request can be composed in JSON format and sent to bidders using HTTP POST. The bid request can also be encoded or compressed. Other bid request formats and transmission methods are contemplated.

Each bidder can determine an appropriate bid based on its own requirements (e.g., budget, targets in placements) and submit a bid response including a bid price and an identifier of a creative to be served, for example, to the transaction manager 110 (or not to respond at all). The transaction manager 110 determines a winning bid (e.g., a highest bid) among bid responses received within a specified time period (e.g., 100 milliseconds). The transaction manager 110 then returns a creative of the winning bid to the client device 420, causing the application 425 to display the creative in the ad space in the user interface 424. The transaction manager 110 can also return a URL for a creative of the winning bid to the client device 420, causing the application 425 on the client device 420 to retrieve the creative from an ad server (e.g., ad server 414, or ad servers 427 external to the server system 422), or from servers of a content distribution network (CDN) 431. In various implementations, the transaction manager 110 can store in the transaction data database 434 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Storing of other information associated with transactions is contemplated.

In one implementation, using the online advertising auction platform described herein, impression sellers and/or impression buyers participating in an identity cooperative can be provided with information from a device graph using information contributed by the sellers, buyers, members of an online advertising platform, and/or other parties. Advantageously, such information can be provided (and in some instances in a merged form, as described above) at the time that an auction occurs, so that the involved parties can take action on the information. Effectively, this enables targeting across multiple devices associated with a particular user in real time. Specifically, the system architecture described herein provides the technical abilities and advantages of aggregating significant amounts of data relating to different user devices, creating relationships among the data, and storing the data in a device graph form so that it can be made available in real-time during an auction to serve an online advertisement. These activities are unique to the realm of online advertising and cannot practically be performed without such computer systems as those described herein. In one example, a user browses to CNN.com using his laptop. A few minutes later, the same user browses to Facebook.com on his smartphone. Using a device graph that has an established relationship between the user's laptop and smartphone (i.e., an actual or probable determination that the two devices are associated with the same user), an impression buyer can target users who have visited CNN.com when they visit Facebook.com as well as other websites.

Figure 5:
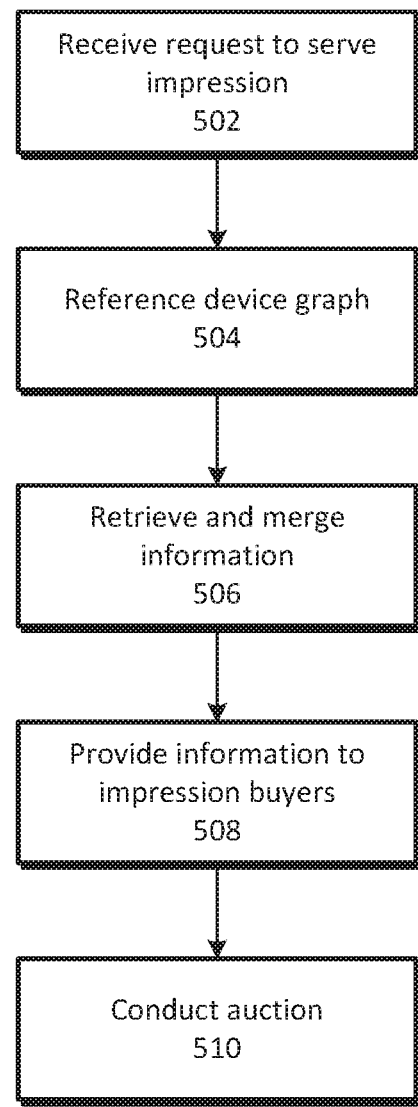
FIG. 5 depicts an example method for utilizing a device graph within the system of FIG. 4.

FIG. 5 depicts an example method for using a device graph in an online advertising auction. In STEP 502, a request for an impression to be served to an impression consumer is received at the online advertising auction platform 400 from a device 420 (e.g., personal computer, laptop, smartphone, etc.) that has a known ANID (determined by, e.g., looking up the ANID in maps cluster 116). The device graph is referenced using the ANID (e.g., via a key-value store 132 as described above) to determine if the ANID has any known matches (STEP 504). If one or more matches are found, the information associated with the ANID is retrieved and, in some instances, merged together (STEP 506). For example, if a particular impression buyer has permission to access all information associated with the devices grouped under one ANID (regardless of whether that buyer was the contributor of the information), then the information from the different devices can be merged and returned to the transaction manager 110. The data can be retrieved in both merged and unmerged forms so that it can be provided differently, if necessary, to different parties based on their respective permissions. Thus, both merged and unmerged segments, and aggregated frequency data can be received at the transaction manager 110. The transaction manager 110 can provide the information in appropriate forms (e.g., based on permissions) to different impression buyers in requests for bids to serve an advertisement to the impression consumer (STEP 508). Impression buyers who are permitted to access merged information are able to benefit by targeting across multiple devices of the impression consumer. The transaction manager can then conduct the impression auction in a manner similar to that described above (STEP 510).

The software can be executed on computing devices, such as server system 422 and other servers and devices described herein, each including a processing unit, a system memory, and a system bus that couples various system components including the system memory to the processing unit. Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. The processor and the memory can be supplemented by, or incorporated in special purpose logic circuitry. The computing devices can also include information carriers suitable for embodying computer program instructions and data, including various forms of non-volatile memory such as semiconductor memory devices (e.g., EPROM, EEPROM, and flash memory devices), magnetic disks (e.g., internal hard disks or removable disks), magneto-optical disks, and CD-ROM and DVD-ROM disks.

Communication networks 413 can include communications media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the client device and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

The system and methods described herein can also be practiced in distributed computing environments, where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The present techniques can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture, such as a non-transitory computer-readable storage medium. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for distributed device identification, the method comprising:
   receiving, by a processing system including a processor, over a network, information defining a unique identifier associated with a user, wherein the user is a unique user of a platform for delivering advertising information to users including the user;
   receiving, by the processing system, over the network, information defining a relationship between unique identifiers associated with devices of the user and the unique identifier associated with the user;
   mapping, by the processing system, the unique identifiers associated with the devices of the user to a platform-wide identifier based at least in part on the unique identifier associated with the user;
   building, by the processing system, a device graph comprising a plurality of device nodes, with related device nodes connected by one or more edges, wherein building the device graph comprises:
   identifying a relationship between a first device and a second device based at least in part of the platform-wide identifier; and
   based on the relationship, defining a link between a node representing the first device in the device graph and a node representing the second device in the device graph, wherein a plurality of nodes in the device graph are respectively associated with information regarding the user; and
   applying a set of permissions to the device graph to limit access to the information regarding the user to contributors to the device graph.

2. The method of claim 1, further comprising, at a later time:
   receiving, by the processing system, over a network the unique identifier associated with the first device and, based thereon, locating the platform-wide identifier; and
   retrieving, by the processing system, using the device graph and the platform-wide identifier, first information relating to the user that is stored in association with the node representing the first device and second information relating to the user that is stored in association with the node representing the second device.

3. The method of claim 2, wherein retrieving the first information and the second information comprises merging corresponding portions of data in the first information and the second information at a time of the retrieving.

4. The method of claim 1, wherein the unique identifier associated with the first device comprises a cookie string, a mobile device identifier, or a combination of both.

5. The method of claim 1, wherein the unique identifier associated with the user comprises a username, a login identifier, an email address, or a combination of these.

6. The method of claim 1, wherein the receiving the unique identifier associated with the first device and the unique identifier associated with the second device comprises receiving the unique identifier associated with the first device and the unique identifier associated with the second device from different data sources.

7. The method of claim 1, wherein the device graph comprises a plurality of device subgraphs, each subgraph comprising nodes representing different devices associated with a same user, each node comprising at least one edge connecting the node to another node in the subgraph.

8. The method of claim 1, wherein the device graph comprises a plurality of segregated device graphs represented as a single device graph.

9. The method of claim 1, wherein the device graph comprises probabilistic relationships between nodes representing different devices.

10. A system for distributed device identification, the system comprising:
    a processing system including a processor; and
    a memory that stores executable instructions that, when executed by the processing system, facilitate performance of operations comprising:
    receiving, over a network, information defining a unique identifier associated with a user, wherein the user is a unique user of a platform for delivering advertising information to users including the user;
    receiving, over the network, information defining a relationship between the unique identifier associated with devices of the user and the unique identifier associated with the user;

mapping the unique identifiers associated with the devices of the user to a platform-wide identifier based at least in part on the unique identifier associated with the user;

building a device graph comprising a plurality of device nodes, with related device nodes connected by one or more edges, wherein building the device graph comprises:

identifying a relationship between a first device and a second device based at least in part of the platform-wide identifier; and based on the relationship, defining a link between a node representing the first device of the user in the device graph and a node representing the second device of the user in the device graph, wherein a plurality of nodes in the device graph are respectively associated with information regarding the user; and applying a set of permissions to the device graph to limit access to the information regarding the user to contributors to the device graph.

11. The system of claim 10, wherein the operations further comprise, at a later time:

receiving over a network the unique identifier associated with the first device and, based thereon, locating the platform-wide identifier; and retrieving, using the device graph and the platform-wide identifier, first information relating to the user that is stored in association with the node representing the first device and second information relating to the user that is stored in association with the node representing the second device.

12. The system of claim 11, wherein the retrieving the first information and the second information comprises merging corresponding portions of data in the first information and the second information at a time of the retrieving.

13. The system of claim 10, wherein the unique identifier associated with the first device comprises a cookie string, a mobile device identifier or a combination of both.

14. The system of claim 10, wherein the unique identifier associated with the user comprises a username, a login identifier, an email address, or a combination of these.

15. The system of claim 10, wherein the unique identifier associated with the first device and the unique identifier associated with the second device are received from different data sources.

16. A non-transitory machine-readable medium, comprising executable instructions that, when executed by a processing system including a processor, facilitate performance of operations, the operations comprising:

receiving, over a network, information defining a unique identifier associated with a user, wherein the user is a unique user of a platform for delivering advertising information to users including the user;

receiving, over the network, information defining a relationship between unique identifiers associated with devices of the user and the unique identifier associated with the user;

mapping, the unique identifiers associated with the devices of the user to a platform-wide identifier based at least in part on the unique identifier associated with the user;

building, a device graph comprising a plurality of device nodes, with related device nodes connected by one or more edges, wherein building the device graph comprises:

identifying a relationship between a first device and a second device based at least in part of the platform-wide identifier; and based on the relationship, defining a link between a node representing the first device in the device graph and a node representing the second device in the device graph, wherein a plurality of nodes in the device graph are respectively associated with information regarding the user; and applying a set of permissions to the device graph to limit access to the information regarding the user to contributors to the device graph.

17. The non-transitory machine-readable medium of claim 16, wherein the operations further comprise;

receiving over a network the unique identifier associated with the first device and, based thereon, locating the platform-wide identifier; and retrieving, using the device graph and the platform-wide identifier, first information relating to the user that is stored in association with the node representing the first device and second information relating to the user that is stored in association with the node representing the second device.

18. The non-transitory machine-readable medium of claim 17, wherein the retrieving the first information and the second information comprises merging corresponding portions of data in the first information and the second information at a time of the retrieving.

19. The method of claim 1, wherein the applying a set of permissions comprises defining respective portions of the device graph and users having access to the respective portions of the device graph.

20. The method of claim 1, wherein the applying a set of permissions comprises limiting access to one or more portions of the device graph.

* * * * *